United States Patent
Usami

(10) Patent No.: US 8,014,260 B2
(45) Date of Patent: Sep. 6, 2011

(54) OPTICAL INFORMATION RECORDING MEDIUM, INFORMATION RECORDING METHOD AND INFORMATION RECORDING SYSTEM

(75) Inventor: Yoshihisa Usami, Fuji (JP)

(73) Assignee: FUJIFILM Corporation, Tokyo (JP)

( * ) Notice: Subject to any disclaimer, the term of this patent is extended or adjusted under 35 U.S.C. 154(b) by 524 days.

(21) Appl. No.: 12/158,622

(22) PCT Filed: Nov. 30, 2006

(86) PCT No.: PCT/JP2006/323934
§ 371 (c)(1),
(2), (4) Date: Jun. 20, 2008

(87) PCT Pub. No.: WO2007/072666
PCT Pub. Date: Jun. 28, 2007

(65) Prior Publication Data
US 2009/0231972 A1    Sep. 17, 2009

(30) Foreign Application Priority Data
Dec. 21, 2005  (JP) ................................ 2005-368054

(51) Int. Cl.
*G11B 3/70* (2006.01)
(52) U.S. Cl. ...................................... 369/284; 369/275.4
(58) Field of Classification Search ........................ None
See application file for complete search history.

(56) References Cited

U.S. PATENT DOCUMENTS

| | | | |
|---|---|---|---|
| 6,738,322 B2 * | 5/2004 | Amble et al. | 369/44.27 |
| 6,765,061 B2 | 7/2004 | Dhar et al. | |
| 7,170,661 B2 * | 1/2007 | Ogasawara et al. | 359/22 |
| 7,719,952 B2 * | 5/2010 | Horimai et al. | 369/275.1 |
| 2003/0185121 A1 | 10/2003 | Narumi et al. | |
| 2005/0078590 A1 | 4/2005 | Sakane et al. | |
| 2005/0226120 A1 * | 10/2005 | Nishiwaki et al. | 369/103 |
| 2006/0140101 A1 | 6/2006 | Tsukagoshi et al. | |
| 2006/0164948 A1 * | 7/2006 | Seko et al. | 369/103 |

FOREIGN PATENT DOCUMENTS

| | | |
|---|---|---|
| JP | 09-259437 A | 10/1997 |
| JP | 2004-177958 A | 6/2004 |
| JP | 2005-018868 A | 1/2005 |
| JP | 2005-502918 A | 1/2005 |

(Continued)

OTHER PUBLICATIONS

Machine translation of JP 06-212457.*

(Continued)

*Primary Examiner* — Lixi C Simpson
(74) *Attorney, Agent, or Firm* — Sughrue Mion, PLLC

(57) ABSTRACT

An optical information recording medium is provided with a substrate having a pregroove formed on one main plane; a reflecting layer arranged on the one main plane of the substrate and reflecting an access controlling laser beam; a selective reflecting layer arranged on the reflecting layer, transmitting the access controlling laser beam and reflecting a recording laser beam; a recording layer arranged on the selective reflecting layer for having information recorded thereon by the recording laser beam; and a reflection preventing layer arranged on the recoding layer. On the substrate, a dummy groove having a shape similar to that of the pregroove is formed on forming regions adjacent to an effective access region on the one main plane.

10 Claims, 5 Drawing Sheets

FOREIGN PATENT DOCUMENTS

| | | |
|---|---|---|
| JP | 2005-032308 A | 2/2005 |
| JP | 2005-078691 A | 3/2005 |
| JP | 2005-338340 A | 12/2005 |
| WO | 02/23542 A1 | 3/2002 |
| WO | WO 2004070714 A1 * | 8/2004 |

OTHER PUBLICATIONS

Holographic media—Ready for launch, achieved 200Gbytes in 2006, Nikkei Electronics issued Jan. 17, 2005.

* cited by examiner

FIG. 5

| | ERROR RATE |
|---|---|
| EXAMPLE | 1 |
| COMPARATIVE EXAMPLE | 12 |

OPTICAL INFORMATION RECORDING MEDIUM, INFORMATION RECORDING METHOD AND INFORMATION RECORDING SYSTEM

TECHNICAL FIELD

The present invention relates to an optical information recording medium for being irradiated with a servocontrol laser beam in addition to a recording laser beam having an information beam which bears information by spatially modulating a laser beam and a recording reference beam, an information recording method and an information recording system for recording information on such an optical information recording medium, and is concerned with an optical information recording medium, an information recording method, and an information recording system which are suitable for use as a holographic optical recording medium, an optical disk, an optical card, etc., for example.

BACKGROUND ART

Generally, holographic recording records information in a recording medium by way of holography by superposing an information beam bearing image information and a reference beam in the recording medium, and writing a generated interference fringe pattern in the recording medium. For reproducing the stored information, the reference beam is applied to the recording medium to reproduce the image information based on the diffraction caused by the interference fringe pattern.

One process of recording an interference pattern in a recording medium is a so-called "two-beam interference process" for guiding an "information beam" and a "reference beam" to two optical paths having different irradiation angles and applying the beams separately to the recording medium to record an interference pattern in the recording medium (see, for example, Patent Document 1).

According to the two-beam interference process, a laser beam emitted from a laser beam source is divided into two laser beams (a first laser beam and a second laser beam) by a beam splitter, for example. The first laser beam is modulated into an information beam with an image by a spatial modulator, and the second laser beam is converted into a reference beam by adjusting its irradiation angle with an angle adjusting mirror. The information beam and the reference beam are applied across each other on the recording medium.

This process is problematic in that it requires an optical system for dividing the laser beam into the two laser beams, an optical system for converging the two laser beams onto the recording medium, and an optical system for adjusting the irradiation angle of one of the laser beams, resulting in a large-size recording and reproducing apparatus. In addition, the process has to meet various requirements, e.g., the recording medium requires very high smoothness and parallelism.

Other background art includes Patent Documents 2 and 3, for example.

There has also heretofore been proposed a recording process (colinear process) for recording information in an optical information recording medium by guiding an information beam and a reference beam to the same optical path to turn them into a recording laser beam, and applying the recording laser beam and a servocontrol laser beam to the optical information recording medium (see, for example, Patent Document 4 and Non-patent Document 1).

The proposed process needs much simpler optical systems than the above two-beam interference process, and hence makes an apparatus required to perform the process smaller in size and lower in cost. Furthermore, the servo technology utilized for CDs and DVDs may be employed to form an interference pattern at desired addresses depending on the eccentricity and surface fluctuations of a rotating optical disk.

For reproducing the information that has been recorded on the recording medium by the proposed process, a reproducing reference beam having the same pattern as the recording reference beam is applied to the recording medium. When the reproducing reference beam is applied to the recording medium, since an area to which the reference beam is applied has been modified by the information beam applied to record the information, the modified area reflects the reproducing reference beam as a reproducing beam representing the information beam. The reproducing beam is separated from the optical path for the reproducing reference beam, and detected by a solid-state imaging device which converts the reproducing beam into an electric signal.

According to the proposed process, the reproducing reference beam and the servocontrol laser beam are applied to the recording medium. The servocontrol laser beam needs to reach servocontrol information provided in the recording medium. As it is necessary to prevent the reproducing reference beam from reaching the servocontrol information, a selective reflecting laser is provided in the recording medium.

Patent Document 1: Japanese Laid-Open Patent Publication No. 2005-018868
Patent Document 2: Japanese Laid-Open Patent Publication No. 2004-177958
Patent Document 3: Japanese Laid-Open Patent Publication No. 2005-502918 (PCT)
Patent Document 4: Japanese Laid-Open Patent Publication No. 2005-032308
Non-patent Document 1: Nikkei Electronics issued on Jan. 17, 2005, p. 105-p. 114

DISCLOSURE OF INVENTION

In the event that the present invention is applied to the proposed process described above, pregrooves defined in a principal surface of a substrate may be used as the servocontrol information.

If such pregrooves area formed in only an effective access area that can be accessed by an access control laser beam, then of the recording characteristics of information recorded in a recording layer, the recording characteristics of a track on the outermost (or innermost) edge and nearby tracks and the recording characteristics of the other tracks are different from each other, and the difference between the recording characteristics tends to be detected as a recording error.

It is an object of the present invention to provide an optical information recording medium, an information recording method, and an information recording system which are capable of substantially equalizing the recording characteristics of a track on the outermost (or innermost) edge of an effective access area and nearby tracks and the recording characteristics of the other tracks, of the recording characteristics of information recorded in a recording layer, for thereby greatly reducing recording errors.

According to the present invention, there is provided an optical information recording medium for being irradiated with an access control laser beam in addition to a recording laser beam having an information beam which bears information by spatially modulating a laser beam and a recording reference beam, comprising a substrate having pregrooves for use in access control, defined in a principal surface thereof in an effective access area which can be accessed by said access control laser beam, a reflecting layer disposed on the principal surface of said substrate, for reflecting said access control laser beam, a selective reflecting layer disposed on said reflecting layer, for passing said access control laser beam therethrough and reflecting said recording laser beam, and a recording layer disposed on said selective reflecting layer, for recording information therein with said recording laser beam, said substrate having a dummy region in an area of said principal surface adjacent to said effective access area, said dummy region having dummy pregrooves similar to said pregrooves.

According to the present invention, there is provided an information recording method of recording information in an optical information recording medium by guiding an information beam which bears information by spatially modulating a laser beam and a recording reference beam to the same optical path to produce a recording laser beam, and applying the recording laser beam and an access control laser beam to the optical information recording medium, wherein said optical information recording medium comprises a substrate having pregrooves for use in access control, defined in a principal surface thereof in an effective access area which is accessible by said access control laser beam, a reflecting layer disposed on the principal surface of said substrate, for reflecting said access control laser beam, a selective reflecting layer disposed on said reflecting layer, for passing said access control laser beam therethrough and reflecting said recording laser beam, and a recording layer disposed on said selective reflecting layer, for recording information therein with said recording laser beam, said substrate having a dummy region in an area of said principal surface adjacent to said effective access area, said dummy region having dummy pregrooves similar to said pregrooves.

According to the present invention, there is provided an information recording system for recording information in an optical information recording medium by applying a recording laser beam and an access control laser beam, comprising means for outputting an information beam which bears information by spatially modulating a laser beam, means for outputting a recording reference beam, means for guiding said information beam and said reference beam to the same optical path to produce the recording laser beam, and means for outputting the access control laser beam, wherein said optical information recording medium comprises a substrate having pregrooves for use in access control, defined in a principal surface thereof in an effective access area which is accessible by said access control laser beam, a reflecting layer disposed on the principal surface of said substrate, for reflecting said access control laser beam, a selective reflecting layer disposed on said reflecting layer, for passing said access control laser beam therethrough and reflecting said recording laser beam, and a recording layer disposed on said selective reflecting layer, for recording information therein with said recording laser beam, said substrate having a dummy region in an area of said principal surface adjacent to said effective access area, said dummy region having dummy pregrooves similar to said pregrooves.

According to these inventions, of the recording characteristics of information recorded in the recording layer, the recording characteristics of a track on the outermost (or innermost) edge of the effective access area and nearby tracks and the recording characteristics of the other tracks are substantially the same as each other, for thereby greatly reducing recording errors.

The dummy region may be disposed between said effective access area and an outer circumferential end of said substrate and adjacent to an outermost edge of said effective access area.

The dummy region which is disposed between the outermost edge of said effective access area and the outer circumferential end of said substrate should preferably have an outer end in a position which is spaced 1 mm or more (toward the center of said substrate) from the outer circumferential end of said substrate toward the center of said substrate.

The dummy region should preferably have an inner end in a position which is spaced 10 mm or less (toward the outer circumferential end) from the outer circumferential end of said substrate toward the center of said substrate.

The dummy region should preferably be disposed between said effective access area and an inner circumferential end of said substrate and adjacent to an innermost edge of said effective access area.

The dummy region which is disposed between the innermost edge of said effective access area and the inner circumferential end of said substrate should preferably have an inner end in a position which is spaced 10 mm or more (toward the outer circumferential end of said substrate) from the inner circumferential end of said substrate toward the outer circumferential end of said substrate.

The dummy region should preferably have an outer end in a position which is spaced 22 mm or less (toward the center of said substrate) from the inner circumferential end of said substrate toward the outer circumferential end of said substrate.

The dummy region should preferably have a range in terms of a radial length of the substrate which is equal to or greater than one-half of a spot diameter of said recording laser beam on a surface of said selective reflecting layer.

The dummy region have a range in terms of the radial length of the substrate, whose lower limit is 100 μm or greater, preferably 500 μm or greater, more preferably 1 mm or greater, and much more preferably 1.5 mm or greater, and whose upper limit is 20 mm or smaller, preferably 10 mm or smaller, more preferably 5 mm or smaller, and much more preferably 3 mm or smaller.

With the optical information recording medium, the information recording method, and the information recording system according to the present invention, the recording characteristics of a track on the outermost (or innermost) edge of the effective access area and nearby tracks and the recording characteristics of the other tracks are substantially the same as each other, for thereby greatly reducing recording errors.

BRIEF DESCRIPTION OF DRAWINGS

FIG. 5 is a table showing measured error rates of an inventive example and a comparative example.

BEST MODE FOR CARRYING OUT THE INVENTION

An embodiment in which an optical information recording medium, an information recording method, and an information recording system according to the present invention are applied to a colinear optical information recording medium will be described below with reference to FIGS. 1 through 5.

Figure 1:
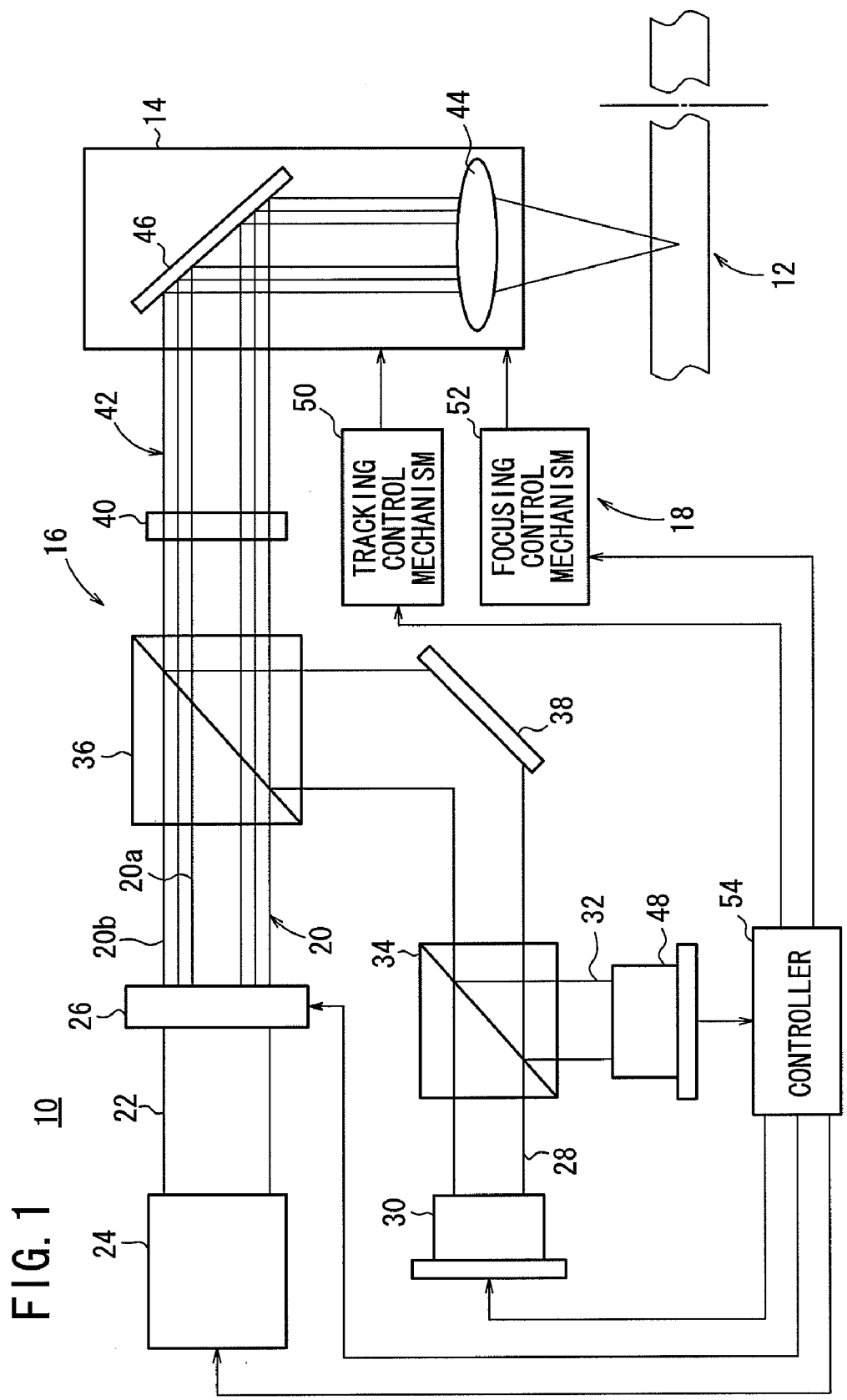
FIG. 1 is a diagram showing an information recording system according to an embodiment of the present invention.

As shown in FIG. 1, an information recording system 10 according to the present embodiment comprises a pickup 14 for optically recording information on and reproducing information from an optical information recording medium 12, an optical system 16 for guiding a laser beam to the pickup 14, and a control system 18 for performing tracking control and focusing control on the pickup 14.

The optical system 16 comprises a first laser beam source 24 for outputting a laser beam 22 for generating an information beam 20a and a reference beam 20b, a spatial optical modulator 26 disposed in the optical path of the laser beam 22 for spatially modulating the laser beam 22 to generate a recording laser beam 20 having patterns of the information beam 20a and the reference beam 20b, a second laser beam source 30 for outputting an access control laser beam 28 for detecting addresses provided in the optical information recording medium 12 and servocontrol information (hereinafter referred to as "access control information"), a first beam splitter 34 disposed in the optical path of the access control laser beam 28 for separating a returning beam 32, a second beam splitter 36 for combining the recording laser beam 20 and the access control laser beam 28 and separating the returning beam 32, a first mirror 38 for guiding the access control laser beam 28 to the second beam splitter 36, and a quarter-wavelength plate 40 for emitting a circularly polarized beam and reducing returning beam noise.

The pickup 14 comprises an objective lens 44 for converging a combined beam 42 (the combined beam of the recording laser beam 20 and the access control laser beam 28) supplied from the optical system 16 onto the optical information recording medium 12, and a second mirror 46 for guiding the combined beam 42 to the objective lens 44.

The control system 18 comprises a photodetector 48 for detecting the returning beam 32 of the access control laser beam 28 separated by the first beam splitter 34 of the optical system 16, and converting the returning beam 32 into an electric signal, a tracking control mechanism 50 for controlling a tracking operation of the pickup 14 depending on the output from the photodetector 48, a focusing control mechanism 52 for controlling a focusing operation of the pickup 14 depending on the output from the photodetector 48, and a controller 54 for controlling the first laser beam source 24, the second laser beam source 30, the spatial optical modulator 26, etc.

Figure 2:
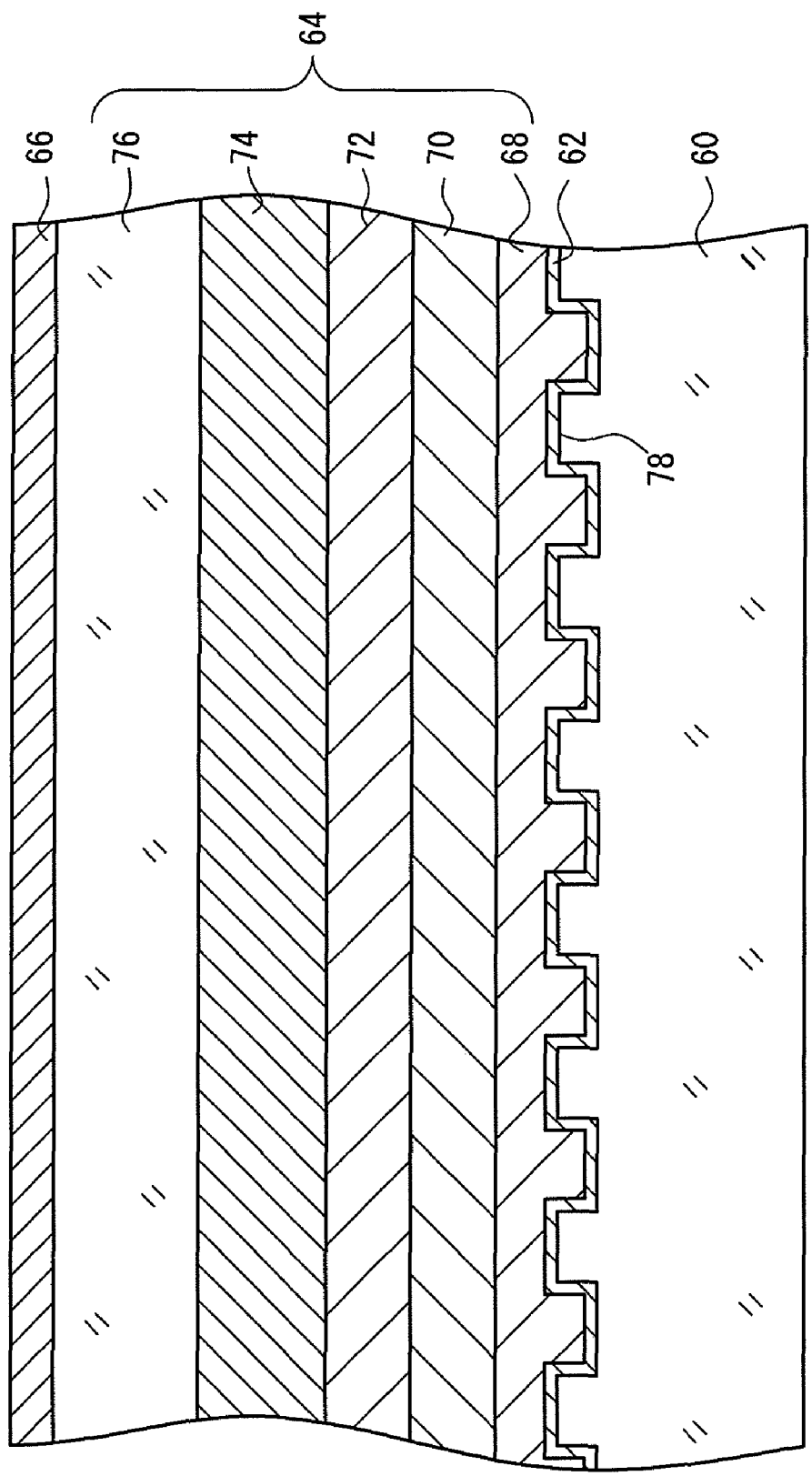
FIG. 2 is a cross-sectional view, partly omitted from illustration, of an optical information recording medium according to the embodiment of the present invention.

As shown in FIG. 2, the optical information recording medium 12 according to the present embodiment comprises a substrate 60, a reflecting layer 62, a transparent layer 64, and an anti-reflection layer 66 which are stacked together.

The transparent layer 64 comprises a plurality of layers. Specifically, the transparent layer 64 comprises a first gap layer 68 disposed on the reflecting layer 62, a selective reflecting layer 70 disposed on the first gap layer 68 for passing the access control laser beam 28 therethrough and reflecting the recording laser beam 20, a second gap layer 72 disposed on the selective reflecting layer 70, a recording layer 74 disposed on the second gap layer 72 for recording information with the recording laser beam 20, and a protective layer 76 disposed on the recording layer 74. The anti-reflection layer 66 is disposed on the protective layer 76.

Preferable materials of the layers of the optical information recording medium 12 will be described below.

The substrate 60 has pregrooves 78 defined as access control information in a principal surface thereof. The reflecting layer 62 is deposited on convex and concave surfaces of the pregrooves 78 defined in the substrate 60, so that the reflecting layer 62 has an upper surface representing the convex and concave surfaces of the pregrooves 78.

The substrate 60 is made of any one of materials including an acrylic resin such as polycarbonate, polymethyl methacrylate, etc., a vinyl chloride resin such as polyvinyl chloride, vinyl chloride copolymer, etc., an epoxy resin, amorphous polyolefin, and polyester, etc. If desired, any of these materials may be combined with each other. Of the above materials, polycarbonate and amorphous polyolefin are preferable from the standpoints of productivity, humidity resistance, dimensional stability, and cost. Glass is preferable from the standpoint of accuracy.

The substrate 60 has a thickness whose lower limit is 0.1 mm or greater, preferably 0.3 mm or greater, or more preferably 0.5 mm or greater, and whose upper limit is 2 mm or smaller, preferably 1.5 mm or smaller, and more preferably 1 mm or smaller. If the substrate 60 is too thin, the optical information recording medium 12 tends to suffer a large warpage. If the substrate 60 is too thick, then the optical information recording medium 12 tends to be heavy, putting a load on the control system 18 for rotating the optical information recording medium 12 at a high speed, so that it will be difficult to control the rotation of the optical information recording medium 12.

The pregrooves 78 have a depth preferably in the range from $\lambda a/(3\ na)$ to $\lambda a/(10\ na)$ where $\lambda a$ represents the wavelength of the access control laser beam 28 and na represents the refractive index of a medium (the first gap layer 68 or the substrate 60) which is positioned on the side of the reflecting layer 62 to which the access control laser beam 28 is applied. Specifically, if the wavelength $\lambda a$ of the access control laser beam 28 is 650 nm and the refractive index na of the medium on the side of the reflecting layer 62 to which the access control laser beam 28 is applied is 1.6, the depth of the pregrooves 78 is in the range from 41 to 135 nm.

Even if the refractive index na somewhat varies, when the wavelength $\lambda a$ is 650 nm, the upper limit of the pregroove depth is 120 nm or smaller, preferably 110 nm or smaller, and more preferably 100 nm or smaller, and the lower limit of the pregroove depth is 50 nm or greater, preferably 60 nm or greater, more preferably 70 nm or greater, and particularly preferably 80 nm or greater.

If the wavelength $\lambda a$ is other than 650 nm, then the pregroove depth should preferably be of a value produced by multiplying the above-mentioned groove depth for the wavelength $\lambda a$ of 650 nm by a value produced by prorating the used wavelength with respect to 650 nm. For example, if the wavelength $\lambda a$ is 780 nm and the refractive index na is 1.6, the pregroove depth is in the range from 49 nm to 163 nm, and if the wavelength $\lambda a$ is 405 nm and the refractive index na is 1.6, the pregroove depth is in the range from 25 nm to 84 nm.

The width of the pregrooves 78 should preferably be greater than the widths of grooves used in CDs, DVDs, etc.

For example, if the wavelength $\lambda a$ of the access control laser beam 28 is 650 nm, for example, then the pregrooves 78 have a width whose lower limit is 0.25 μm or greater, preferably 0.35 μm or greater, more preferably 0.45 μm or greater, and much more preferably 0.55 μm or greater, and whose upper limit is 1.05 μm or smaller, preferably 0.95 μm or smaller, more preferably 0.85 μm or smaller, and much more preferably 0.75 μm or smaller.

If the wavelength $\lambda a$ of the access control laser beam 28 is 780 nm, then the pregrooves 78 have a width whose lower limit is 0.45 μm or greater, preferably 0.6 μm or greater, more preferably 0.8 μm or greater, and much more preferably 1 μm or greater, and whose upper limit is 2 μm or smaller, preferably 1.6 μm or smaller, more preferably 1.3 μm or smaller, and much more preferably 1.1 μm or smaller.

If the wavelength λa of the access control laser beam 28 is 405 nm, then the pregrooves 78 have a width whose lower limit is 0.2 μm or greater, preferably 0.25 μm or greater, more preferably 0.3 μm or greater, and much more preferably 0.35 μm or greater, and whose upper limit is 1 μm or smaller, preferably 0.8 μm or smaller, more preferably 0.6 μm or smaller, and much more preferably 0.5 μm or smaller.

The pregrooves 78 have an angle whose lower limit may selectively be 25° or greater, 35° or greater, 40° or greater, and 45° or greater, and whose upper limit may selectively be 90° (meaning a right angle) or smaller, 80° or smaller, 70° or smaller, and 60° or smaller.

Though 405 nm, 650 nm, and 780 nm have typically been indicated as the wavelength λa of the access control laser beam 28 in the above examples, the wavelength λa is not limited to those values, but may be in the range shown below.

Rather than 405 nm, any wavelengths in the range from 350 to 500 nm, preferably in the range from 390 to 440 nm, and more preferably in the range from 400 to 420 nm may be used as the wavelength λa.

Rather than 650 nm, any wavelengths in the range from 620 to 700 nm, preferably in the range from 640 to 690 nm, and more preferably in the range from 650 to 680 nm may be used as the wavelength λa.

Rather than 780 nm, any wavelengths in the range from 750 to 1000 nm, preferably in the range from 770 to 900 nm, and more preferably in the range from 780 to 830 nm may be used as the wavelength λa.

The pregrooves 78 should preferably have a track pitch as mentioned below.

If the wavelength λa of the access control laser beam 28 is in the range from 620 to 700 nm, then the pregrooves 78 have a track pitch whose lower limit is 0.85 μm or greater, preferably 1.1 μm or greater, more preferably 1.3 μm, and much more preferably 1.5 μm, and whose upper limit is 30 μm or smaller, preferably 20 μm or smaller, more preferably 10 μm or smaller, much more preferably 5 μm or smaller, and further more preferably 2 μm or smaller.

Normal DVDs (the wavelength of the laser beam=about 650 nm) have a track pitch of 0.74 μm. With the recording layer 74 provided according to the present embodiment, the track pitch should preferably be greater because tracking tends to become unstable due to the beams being scattered on their way. However, it is preferable to set the track pitch to the above values because if it is too large, the recording density will be lowered.

If the wavelength λa of the access control laser beam 28 is in the range from 750 to 1000 nm, then the pregrooves 78 have a track pitch whose lower limit is 1.7 μm or greater, preferably 1.9 μm or greater, and more preferably 2.3 μm or greater, and whose upper limit is 30 μm or smaller, preferably 20 μm or smaller, more preferably 10 μm or smaller, much more preferably 5 μm or smaller, and much more preferably 2 μm or smaller.

Normal CDs (the wavelength of the laser beam=about 780 nm) have a track pitch of 1.6 μm. With the recording layer 74 provided according to the present embodiment, the track pitch should preferably be greater because tracking tends to become unstable due to the beams being scattered on their way. However, it is preferable to set the track pitch to the above values because if it is too large, the recording density will be lowered.

If the wavelength λa of the access control laser beam 28 is in the range from 350 to 500 nm, then the pregrooves 78 have a track pitch whose lower limit is 0.4 μm or greater, preferably 0.6 μm or greater, more preferably 0.8 μm, and much more preferably 1 μm, and whose upper limit is 30 μm or smaller, preferably 20 μm or smaller, more preferably 10 μm or smaller, much more preferably 5 μm or smaller, and further more preferably 2 μm or smaller.

Normal CDs (the wavelength of the laser beam=about 405 nm) have a track pitch ranging from 0.32 to 0.4 μm. With the recording layer 74 provided according to the present embodiment, the track pitch should preferably be greater because tracking tends to become unstable due to the beams being scattered on their way. However, it is preferable to set the track pitch to the above values because if it is too large, the recording density will be lowered.

These values of the pregrooves 78 can be measured by an AFM (Atomic Force Microscope). If the depth of the pregrooves 78 is represented by D, then the angle of the pregrooves 78 is defined as the angle formed between a straight line interconnecting a slanted portion which is D/10 deep from the surface of the substrate 60 before the pregrooves 78 are formed therein and a slanted portion which is D/10 high from the deepest portion of the pregrooves 78, and a surface of the substrate 60 (e.g., the bottom surface of the pregrooves 78).

For fabricating the substrate 60 having the pregrooves 78 of such a groove configuration, it is necessary that a stamper used for injection-molding the substrate 60 be formed by highly accurate mastering. The mastering process should preferably employ cutting by a DUV (deep ultraviolet rays having a wavelength of 330 nm or smaller) laser or EB (electron beam).

Figure 3:
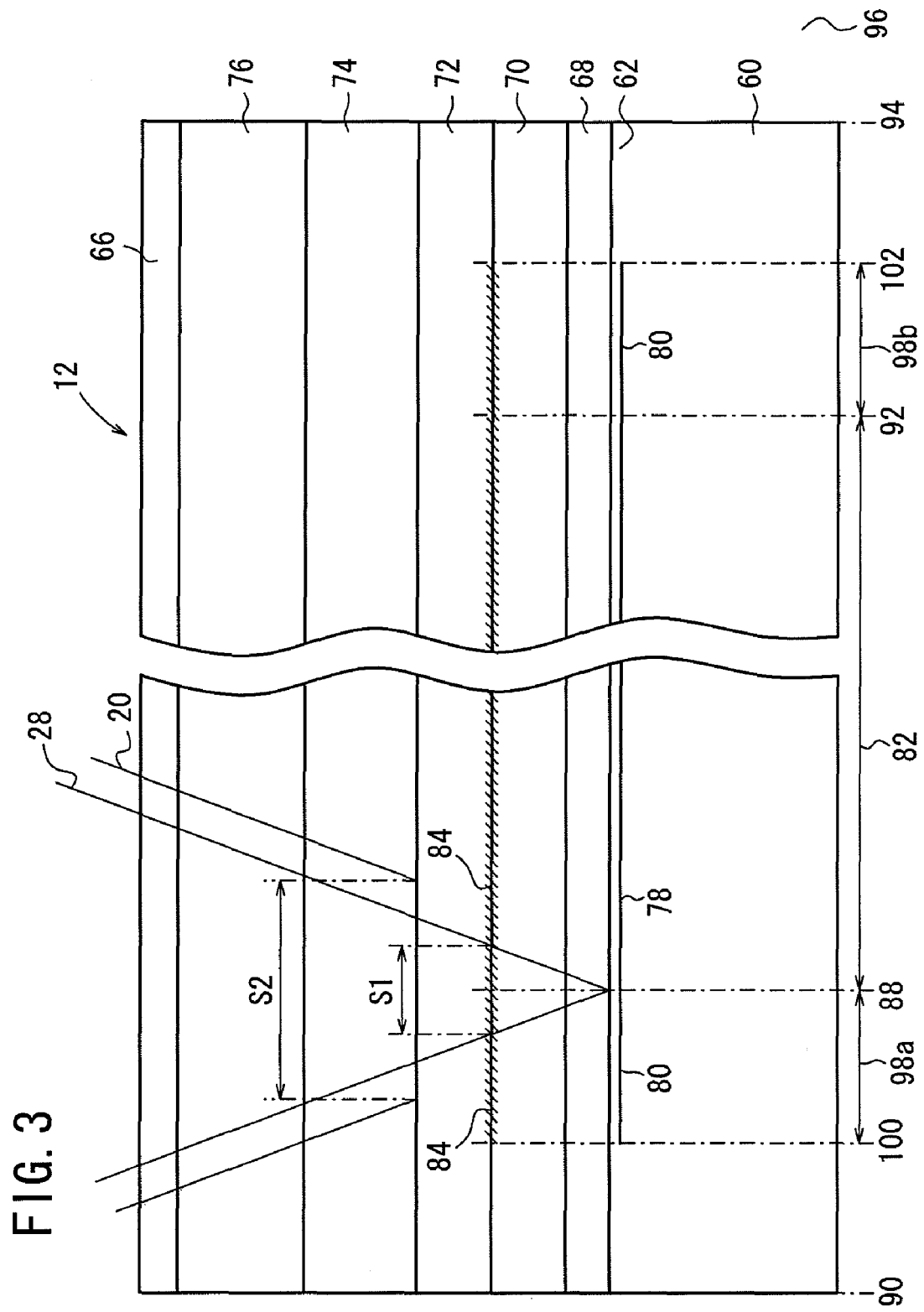
FIG. 3 is a view illustrative of a dummy groove forming area of the optical information recording medium according to the embodiment of the present invention.

According to the present embodiment, as shown in FIG. 3, dummy grooves 80 are formed in an inner circumferential area and/or an outer circumferential area of the substrate 60. The reasons for the formation of the dummy grooves 80 will be described below with reference to FIGS. 3 and 4. The area where the pregrooves are formed is an effective access area 82 where addresses can be accessed by the access control laser beam 28.

Figure 4:
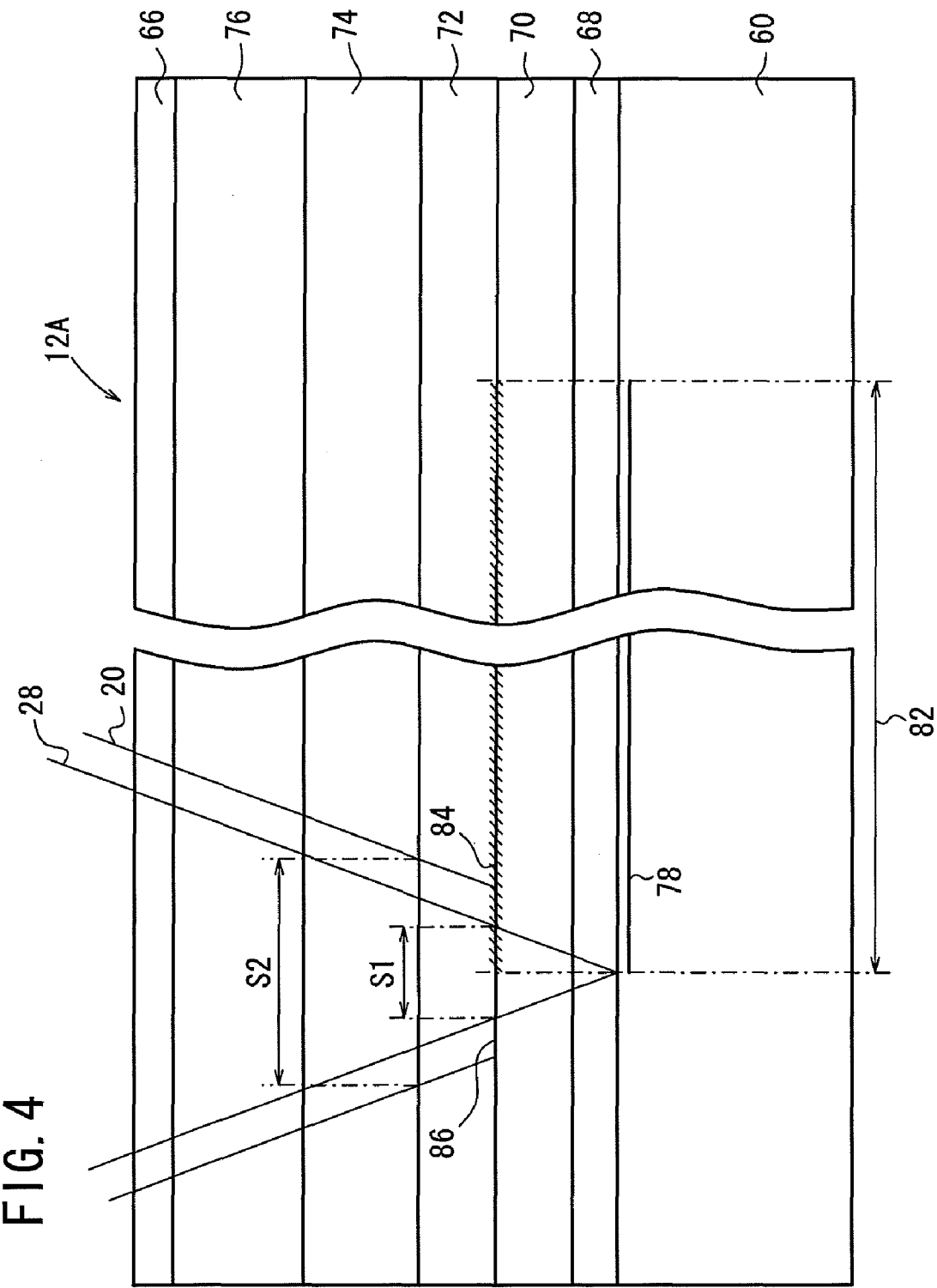
FIG. 4 is a view illustrative of an optical information recording medium according to a comparative example.

An optical information recording medium 12A free of the dummy grooves 80 according to a comparative example will be analyzed below. As shown in FIG. 4, the selective reflecting layer 70 is grown differently in an area corresponding to the effective access area 82 where the pregrooves 78 are formed and another area. Specifically, the area corresponding to the effective access area 82 has a rough surface 84 as an interface with the second gap layer 72 because of the pregrooves 78, and the other area has a flat surface 86.

Generally, the access control laser beam 28 has a shorter wavelength, and the recording laser beam 20 has a longer wavelength. If the access control laser beam 28 is positioned on a track on the outermost (or innermost) edge of the effective access area 82 to record information in the track, the access control laser beam 28 has a beam spot diameter S1 of about 100 μm on the selective reflecting layer 70, and the recording laser beam 20 has a beam spot diameter S2 of about 200 μm on the selective reflecting layer 70 and hence has its spot extending outwardly of the spot of the access control laser beam 28. A portion in the outwardly extending part of the spot is positioned out of the area corresponding to the effective access area 82. In other words, both the rough surface 84 with the pregrooves 78 and the flat surface 86 exist in the spot of the recording laser beam 20 on the selective reflecting layer 70, making the recording characteristics of a track on the outermost (or innermost) edge and nearby tracks and the recording characteristics of the other tracks different from each other, of the recording characteristics of information recorded in the recording layer 74, and the difference between the recording characteristics is detected as a recording error.

According to the present embodiment, as shown in FIG. 3, dummy grooves 80 (of the same shape as the pregrooves 78) disposed adjacent to an outermost edge 88 of the effective access area 82 and comprising a plurality of tracks along a track on the outermost edge 88 of the effective access area 82 are formed between the outermost edge 88 of the effective access area 82 and an outer circumferential end 90 of the substrate 60 of the optical information recording medium 12, and dummy grooves 80 (of the same shape as the pregrooves 78) disposed adjacent to an innermost edge 92 of the effective access area 82 and comprising a plurality of tracks along a track on the innermost edge 92 of the effective access area 82 are defined between the innermost edge 92 of the effective access area 82 and an outer circumferential end 94 (an inner wall of a central hole 96) of the substrate 60.

As a result, when the access control laser beam 28 is positioned on the track on the outermost edge 88 (or the innermost edge 92) of the effective access area 82 to record information in the track, the area including the pregrooves 78 and the area including the dummy grooves 80 exist together in the spot of the recording laser beam 20 on the selective reflecting layer 70. Since both of those areas have the rough surface 84, the recording characteristics of a track on the outermost edge 88 (or the innermost edge 92) of the effective access area 82 and nearby tracks and the recording characteristics of the other tracks, of the recording characteristics of information recorded in the recording layer 74, are substantially the same as each other, thereby greatly reducing recording errors.

Regions 98a, 98b where the dummy grooves 80 are formed should preferably have a range in terms of a radial length, for example, equal to or greater than one-half of the spot diameter S2 of the recording laser beam 20 on the surface (the interface with the second gap layer 72) of the selective reflecting layer 70. Specifically, the radial length of the regions 98a, 98b where the dummy grooves 80 are formed may have a lower limit selected from 100 µm or greater, 500 µm or greater, 1 mm or greater, and 1.5 mm or greater, and an upper limit selected from 20 mm or smaller, 10 mm or smaller, 5 mm or smaller, and 3 mm or smaller.

The region 98a where the dummy grooves 80 are formed has an outer end 100 disposed between the outermost edge 88 of the effective access area 82 and the outer circumferential end 90 of the substrate 60. The outer end 100 should preferably be in a position which is spaced 1 mm from the outer circumferential end 90 of the substrate 60 or more (toward the center of the substrate 60). The region 98a where the dummy grooves 80 are formed has an inner end (the outermost edge 88 of the effective access area 82) which should preferably be in a position which is spaced 10 mm from the outer circumferential end 90 of the substrate 60 or less (toward the outer circumferential end 90 of the substrate 60).

The region 98b where the dummy grooves 80 are formed has an inner end 102 disposed between the innermost edge 92 of the effective access area 82 and the inner circumferential end 94 (the inner wall of the central hole 96) of the substrate 60. The inner end 102 should preferably be in a position which is spaced 10 mm from the inner circumferential end 94 of the substrate 60 or more (toward the outer circumferential end 90 of the substrate 60). The region 98b where the dummy grooves 80 are formed has an outer end (the innermost edge 92 of the effective access area 82) which should preferably be in a position which is spaced 18 mm from the inner circumferential end 94 of the substrate 60 or less (toward the center of the substrate 60).

If the regions 98a, 98b where the dummy grooves 80 are formed are too narrow, then the ability of the dummy grooves 80 to reduce recording errors is lowered. If the regions 98a, 98b where the dummy grooves 80 are formed are too wide, then the effective access area 82 is reduced, and the sputter cutting time is prolonged, resulting in reduced productivity.

The reflecting layer 62 is grown by a sputtering process, for example. The reflecting layer 62 is made of a metal or a mixture thereof, and should preferably be made of a material having a melting point of 500° C. or higher for a better keeping quality.

Preferable metals for being contained in the reflecting layer 62 are Ag, Au, Al, Cu, Ti, and Pd, and particularly preferable materials are Ag, Au, and Al.

A mixture should preferably comprise 50 wt % or more of one of the above preferable metal component and one or more of other preferable metal components or the following elements:

In, Ca, P, Sn, Zn, Bi, Nd, Y, and Cu

Particularly, AgInCa, AgP, AgPX (X represents one of the above elements), AgBiNd, AgBiY, AgNdCu, AgBi, AgInSn, and AgPdCu are preferable, and, of these mixtures, AgNdCu, AgPdCu, and AgBiNd are most preferable.

Preferable sputtering growth conditions for the reflecting layer 62 are as follows:

The applied voltage has a lower limit of 200 V or higher, preferably 400 V or higher, and more preferably 600 V or higher, and has an upper limit of 3000 V or lower, preferably 2000 V or lower, and more preferably 1500 V or lower.

The applied output has a lower limit of 0.5 kW or greater, preferably 1 kW or greater, and more preferably 2 kW or greater, and has an upper limit of 30 kW or smaller, preferably 20 kW or smaller, and more preferably 10 kW or smaller.

The gas pressure has a lower limit of 0.01 Pa or higher, preferably 0.05 Pa or higher, and more preferably 0.1 Pa or higher, and has an upper limit of 20 Pa or lower, preferably 10 Pa or lower, and more preferably 5 Pa or lower.

The sputtering time has a lower limit of 0.1 second or longer, preferably 0.5 second or longer, and more preferably 1 second or longer, and has an upper limit of 500 seconds or shorter, preferably 50 seconds or shorter, and more preferably 10 seconds or shorter.

The gas flow rate has a lower limit of 0.1 SCCM or greater, preferably 1 SCCM or greater, and more preferably 5 SCCM or greater, and has an upper limit of 500 SCCM or smaller, preferably 200 SCCM or smaller, and more preferably 100 SCCM or smaller.

The gas should preferably be an inert gas, preferably argon or nitrogen, and more preferably argon.

The oxygen concentration has a lower limit of 0.01 ppm or greater and preferably 0.1 ppm or greater, and has an upper limit of 1% or smaller, preferably 0.1% or smaller, and more preferably 0.01% or smaller.

The moisture content has a lower limit of 0.0001 ppm or greater, preferably 0.001 ppm or greater, and more preferably 0.01 ppm, and has an upper limit of 100 ppm or smaller, preferably 10 ppm or smaller, and more preferably 1 ppm or smaller.

The first gap layer 68 is made of, for example, a polymeric material such as polymethyl methacrylate, acrylate/methacrylate copolymer, styrene/maleic anhydride copolymer, polyvinyl alcohol, N-methylolacrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate, or the like, or a surface modifier such as a silane coupling agent or the like.

The first gap layer 68 can be produced by dissolving or dispersing one of the above materials into a suitable solvent to prepare a solution, and thereafter applying the solution to the surface of the substrate by a coating method such as spin coating, dip coating, extrusion coating, bar coating, screen printing, or the like. The first gap layer 68 has a thickness in the range from 0.5 to 300 µm, preferably from 5 to 200 µm, and more preferably from 10 µm to 120 µm. An ultraviolet-curable material or a thermosetting material, particularly an ultraviolet-curable material, is also preferable as the material of the first gap layer 68.

The first gap layer 68 may also be produced by applying a film of organic material, preferably polycarbonate, TAC, PMMA, or the like, or particularly preferably PMMA. The film may be applied by a pressure-sensitive adhesive or an ultraviolet-curable adhesive.

In addition, a vacuum-coated layer of inorganic material may be formed for the purposes of increased moisture resistance, rigidity, and optical properties.

The selective reflecting layer 70 may be any layer insofar as it can be used in a dichroic mirror. According to the present embodiment, since two types of laser beams (the access control laser beam 28 and the recording laser beam 20) are applied from above the optical information recording medium 12 in the information recording system 10 according to the embodiment shown in FIG. 1, the selective reflecting layer 70 should preferably be of a film design for passing the access control laser beam 28 therethrough and reflecting the recording laser beam 20 therefrom.

The selective reflecting layer 70 is made of a granular material having an average particle diameter ranging from 0.001 µm to 10 µm measured by X-ray diffractometry. Surface irregularities of the selective reflecting layer 70 should preferably have dimensions ranging from 0.001 µm to 10 µm measured by an AFM (Atomic Force Microscope). If the particles of the granular material are too small, then the selective reflecting layer 70 has a poor adhesive capability, resulting in poor keeping quality.

The material of the selective reflecting layer 70 may be a material selected from the group consisting of metal oxides including SiO, $SiO_2$, ZnO, $SnO_2$, $Al_2O_3$, $TiO_2$, $In_2O_3$, MgO, $ZrO_2$, etc., nitrides including $Si_3N_4$, AlN, TiN, BN, ZrN, etc., sulfides including ZnS, $I_2S_3$, $TaS_4$, etc., carbides including SiC, TaC, $B_4C$, WC, TiC, ZrC, etc., fluorides including $MgF_2$, etc., and diamond-like carbon, or a mixture of two or more materials selected from the above group.

The selective reflecting layer 70 can be produced by vacuum deposition, sputtering, plasma CVD, optical CVD, ion plating, or electron beam evaporation. Of these processes, sputtering is most preferable. Though DC magnetron or RF magnetron may be employed, DC magnetron sputtering is preferable.

The selective reflecting layer 70 should preferably be of a laminated film structure including layers ranging from two to fifty layers. Specifically, the selective reflecting layer 70 comprises two or more laminated layers, preferably three or more laminated layers, and more preferably five or more laminated layers. The number of laminated layers has an upper limit of 50 layers or fewer, preferably 30 layers or fewer, more preferably 15 layers or fewer, and much more preferably 10 layers or fewer.

The selective reflecting layer 70 should preferably include alternate layers of high and low refractive indexes. The refractive index difference between adjacent layers of high and low refractive indexes should be in the range from 0.1 to 10. Specifically, the refractive index difference should preferably be 0.1 or greater, or 0.2 or greater, or 0.3 or greater, or 0.4 or greater. The refractive index difference has an upper limit of 10 or smaller, preferably 7 or smaller, and more preferably 5 or smaller. If the laminated film structure of the selective reflecting layer is made up of three layers, for example, including a lower layer having a refractive index n1, an intermediate layer having a refractive index n2, and an upper layer having a refractive index n3, then these refractive indexes may be of the relationship: n3>n2>n1.

The selective reflecting layer 70 has a thickness preferably in the range from $\lambda/(20\,n)$ to $3\lambda$ where $\lambda$ represents the wavelength of the recording laser beam 20 and n represents the refractive index of a medium which is positioned on the side of the selective reflecting layer 70 to which the recording laser beam 20 is applied. Specifically, the thickness is $\lambda/(20\,n)$ or greater, preferably $\lambda/(12\,n)$ or greater, more preferably $\lambda/(9\,n)$, and much more preferably $\lambda/(7\,n)$. The thickness has an upper limit of $3\lambda$ or smaller, preferably $2\lambda$ or smaller, more preferably $\lambda$ or smaller, and much more preferably $(3/4)\lambda$ or smaller.

The difference between the thickness of the selective reflecting layer 70 and the thickness of an adjacent layer should preferably be $\lambda/2$ where $\lambda$ represents the wavelength of the recording laser beam 20.

The second gap layer 72 is made of, for example, a polymeric material such as polymethyl methacrylate, acrylate/methacrylate copolymer, styrene/maleic anhydride copolymer, polyvinyl alcohol, N-methylolacrylamide, styrene/vinyltoluene copolymer, chlorsulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate, or the like, or a surface modifier such as a silane coupling agent or the like.

The second gap layer 72 can be produced by dissolving or dispersing one of the above materials into a suitable solvent to prepare a solution, and thereafter applying the solution to the surface of the substrate by a coating method such as spin coating, dip coating, extrusion coating, bar coating, screen printing, or the like. The second gap layer 72 has a thickness in the range from 0.5 to 300 µm, preferably from 5 to 200 µm, and more preferably from 10 µm to 120 µm. An ultraviolet-curable material or a thermosetting material, particularly an ultraviolet-curable material, is also preferable as the material of the second gap layer 72.

The second gap layer 72 may also be produced by applying a film of organic material, preferably polycarbonate, TAC, PMMA, or the like, or particularly preferably PMMA. The film may be applied by a pressure-sensitive adhesive or an ultraviolet-curable adhesive.

In addition, a vacuum-coated layer of inorganic material may be formed for the purposes of increased moisture resistance, rigidity, and optical properties.

The recording layer 74 is made of material containing a photothermal conversion material, a photosensitive resin, a binder, and other components suitably selected if necessary.

The photosensitive resin may be any material insofar as it is used in holography, and may be suitably selected depending on the purpose. For example, a photopolymer is preferable.

The photopolymer may be any material insofar as it undergoes a polymerization reaction when irradiated with light and is turned into a polymeric material, and may be suitably selected depending on the purpose. For example, the photopolymer contains a monomer and a photoinitiator, and also contains, if necessary, other components such as a sensitizer, an oligomer, etc.

The photopolymer may be any of the materials described in "Photopolymer Handbook" (Kogyo Chousakai, 1989), "Photopolymer Technology" (The Nikkan Kogyo Shimbun, Ltd., 1989), SPIE collected preprints, Vol. 3010, p. 354-372 (1997), and SPIE collected preprints, Vol. 3291, p. 89-103 (1998). In addition, the photopolymer may be any of the materials described in U.S. Pat. Nos. 5,759,721, 4,942,112, 4,959,284, 6,221,536 and 6,743,552, WO 97/44717, WO 97/13183 and WO 99/26112, Japanese Patent Nos. 2880342, 2873126, 2849021, 3057082 and 3161230, Japanese Laid-Open Patent Publication Nos. 2001-316416, and 2000-275858.

The photopolymer is irradiated with the recording beam to change its optical characteristics by way of the diffusion of a low-molecular component. In order to reduce a volumetric change upon polymerization, there may be added a component which is diffused in a direction opposite to the polymerizing component, or there may be added a compound having an acid cleavage structure separately from the polymer. For forming the recording layer using the photopolymer which contains the low-molecular component, the recording layer may be required to have a structure for retaining a liquid in the recording layer. If the compound having the acid cleavage structure is added, then an expansion caused by the cleavage and a shrinkage caused by the polymerization of the monomer compensate for each other to reduce a volumetric change.

The monomer is not limited to particular materials, but may be selected depending on the purpose. For example, the monomer may be a radical-polymerizable monomer having an unsaturated bond such as an acrylic group or a methacrylic group, a cation-polymerizable monomer having an ether structure such as an epoxy ring or an oxetane ring, or the like. These monomers may be monofunctional or multifunctional, and may be produced by a photocrosslinking reaction.

The radical-polymerizable monomer may be acryloylmorpholine, phenoxyethyl acrylate, isobornyl acrylate, 2-hydroxypropyl acrylate, 2-ethylhexyl acrylate, 1,6-hexanediol diacrylate, tripropylene glycol diacrylate, propoxylated neopentyl glycol diacrylate, 1,9-nonanediol diacrylate, hydroxypivalate neopentyl glycol diacrylate, ethoxylated bisphenol A diacrylate, polyethylene glycol diacrylate, pentaerythritol triacrylate, pentaerythritol tetraacrylate, pentaerythritol hexaacrylate, ethoxylated glycerol triacrylate, trimethylolpropane triacrylate, ethoxylated trimethylolpropane acrylate, 2-napht-1-oxyethyl acrylate, 2-carbazoil-9-ilethyl acrylate, (trimethyl silyloxy) dimethyl silylpropyl acrylate, vinyl-1-naphtate, N-vinylcarbazol, 2,4,6-tribromphenyl acrylate, pentabrom acrylate, phenylthioethyl acrylate, tetrahydrofurfuryl acrylate, or the like, for example.

The cation-polymerizable monomer may be bisphenol A epoxy resin, phenol novolac epoxy resin, glyceroltriglycidyl ether, 1,6-hexaneglycidyl ether, vinyl trimethoxysilane, 4-vinyl phenyl trimethoxysilane, γ-methacryloxypropyl triethoxysilane, compounds represented by the s (M1) through (M6) shown below, or the like, for example.

One of these monomers may be used alone, or two or more of these monomers may be used in combination.

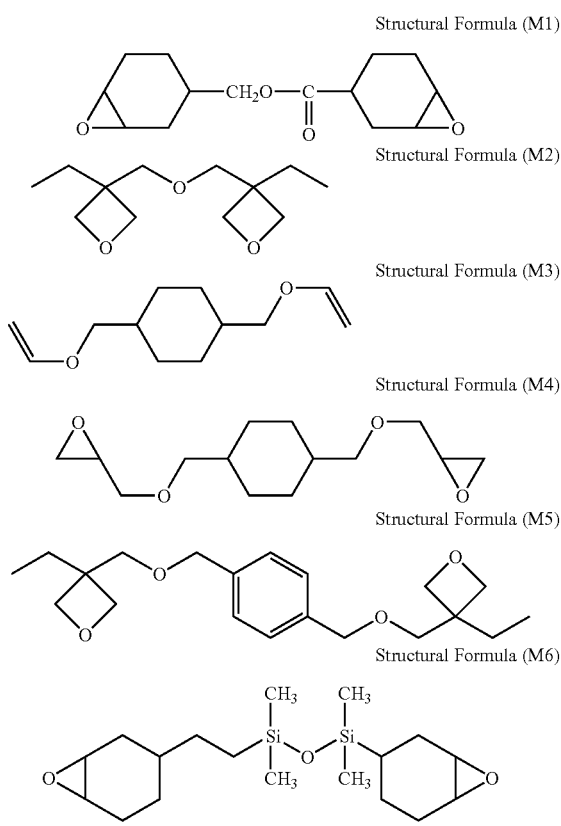

The photoinitiator may be any material insofar as it is sensitive to the recording beam, and may be a material which will cause radical polymerization, cation polymerization, crosslinking reaction, or the like when irradiated with light.

The photoinitiator may be 2,2'-bis(o-chlorophenyl)-4,4',5,5'-tetraphenyl-1,1'-biimidazole, 2,4,6-tris(trichloromethyl)-1,3,5-triazine, 2,4-bis(trichloromethyl)-6-(p-methoxyphenyl vinyl)-1,3,5-triazine, diphenyliodonium tetrafluoroborate, diphenyliodonium hexafluorophosphate, 4,4'-di-t-butyl-diphenyliodonium tetrafluoroborate, 4-diethylaminophenyl-benzenediazonium hexafluorophosphate, benzoin, 2-hydroxy-2-methyl-1-phenylpropane-2-on, benzophenone, thioxanthone, 2,4,6-trimethylbenzoyl diphenylacyl phosphine oxide, triphenyl butylborate tetraethylammonium, bis (η-5-2-,4-cyclopentadiene-1-il), bis[2,6-difluoro-3-(1H-pyrrole-1-il)phenyltitanium], diphenyl-4-phenylthiophenylsulfonium-hexafluorophosphate, or the like, for example. One of these monomers may be used alone, or two or more of these monomers may be used in combination. A sensitizing dye may also be used depending on the wavelength of the applied beams.

For the purpose of improving the storage stability of the recording layer, a polymerization inhibitor and an oxidation inhibitor for the photopolymer may be added. The polymerization inhibitor and the oxidation inhibitor may be hydroquinone, p-benzoquinone, hydroquinone monomethylether, 2,6-ditertiary butyl-p-cresol, 2,2'-methylenebis(4-methyl-6-tertiary-butylphenol), triphenylphosphite, trisnonylphosphite, phenothiazine, N-isopropyl-N'-phenyl-p-phenylenediamine, or the like, for example. The polymerization inhibitor and the oxidation inhibitor are added in an amount which is 3% by weight or less with respect to the entire amount of the monomer used in the composition. If the amount exceeds 3% by weight, then the polymerization will be retarded or will not occur at all in extreme cases.

The photopolymer is produced by stirring and mixing the monomer, the photoinitiator, and other components, if necessary, and causing them to react. If the obtained phootopolymer is sufficiently low in viscosity, then it can be cast to produce the recording layer. If the viscosity of the phootopolymer is so high that it cannot be cast, then the photopolymer can be placed on a second substrate by a dispenser, and the first substrate can be pressed against the photopolymer as if covering the photopolymer to spread the photopolymer to produce the recording layer.

Useful photosensitive resins other than the photopolymer include (1) a photorefractive material exhibiting a photorefractive effect (which develops a spatial charge distribution to modulate a refractive index when irradiated with light), (2) a photochromic material which isomerizes molecules to modulate a refractive index when irradiated with light), and (3) a chalcogen material.

The photorefractive material referred to above in (1) may be any photorefractive material insofar as it exhibits the photorefractive effect, and may be suitably selected depending on the purpose. For example, it may contain a charge generating material and a charge transporting material, and other components if necessary.

The charge generating material is not limited to particular materials, but may be selected depending on the purpose. Examples of the charge generating material include phthalocyanine pigments such as metallic phthalocyanine or metal-free phthalocyanine and derivatives thereof; naphthalocyanine pigments; azo pigments such as monoazo, disazo and trisazo pigments; perylene dyes/pigments; indigo dyes/pigments; quinacridone dyes/pigments; polycyclic quinone dyes/pigments such as anthraquinone and anthanthrone; cyanine dyes/pigments; charge-transfer complex composed of a acceptor and a donor as typified by TTF-TCNQ; azulenium salt; fullerene as typified by $C_{60}$ and $C_{70}$ and the derivative thereof, i.e., methanofullerene; and the like. One of these charge generating material may be used alone, or two or more of these charge generating material may be used in combination.

The charge transporting material is a material for transporting holes or electrons, and may be a low-molecular compound or a polymeric compound.

The charge transporting material is not limited to particular materials, but may be selected depending on the purpose. Examples of the charge transporting material include nitrogen-containing cyclic compounds such as indole, carbazole, oxazole, inoxazole, thiazole, imidazole, pyrazole, oxadiazole, pyrazoline, thiadiazole, triazole, and the derivatives thereof; hydrazone compounds; triphenylamines; triphenylmethanes; butadienes; stilbenes; quinone compounds such as anthraquinone diphenoquinone, and the derivatives thereof; fullerene such as $C_{60}$ and $C_{70}$, and the derivatives thereof; π-conjugated polymers and oligomers such as polyacethylene, polypyrrole, polythiophene, polyaniline; σ-conjugated polymers and oligomers such as polysilane, polygermane; polycyclic aromatic compounds such as anthracene, pyrene, phenanthrene, coronene. One of these charge transporting material may be used alone, or two or more of these charge transporting material may be used in combination.

The recording layer may be produced using the photorefractive material by forming a coating with a coating solution that has been prepared by dissolving or dispersing the photorefractive material in a solvent, and removing the solvent from the coating. Alternatively, the recording layer may be produced by forming a coating with the photorefractive material that has been fluidized with heat, and quenching the coating.

The photochromic material referred to above in (2) may be any photochromic material insofar as it can cause a photochromic reaction, and may be suitably selected depending on the purpose. Examples of the photochromic material include azobenzene compounds, stilbene compounds, indigo compounds, thioindigo compounds, spiropyran compounds, spiroxazine compounds, flugide compounds, anthracene compounds, hydrazone compounds, cinnamic acid compounds, diarylethene compounds, or the like. Particularly preferable among these materials are those alter their conformation by cis-trans isomerization due to light irradiation, for example, azobenzene derivatives and stilbene derivatives; and those alter their conformation by ring-opening/closing due to light irradiation, for example, spiropyran derivatives and spiroxazine derivatives.

The chalcogen material referred to above in (3) may be a material containing chalcogenide glass which contains a chalcogen element and metal particles which are dispersed in the chalcogenide glass and which can be diffused into the chalcogenide glass when irradiated with light, for example.

The chalcogenide glass is made of a non-oxide amorphous material containing a chalcogen element such as S, Te, or Se, and is not limited to any material insofar as it can optically be doped with metal particles.

The amorphous material containing a chalcogen element may be Ge—S glass, As—S glass, As—Se glass, As—Se—Ce glass, or the like, for example. Of these materials, Ge—S glass is particularly preferable. If Ge—S glass is used as the chalcogenide glass, then the composition ratio of Ge and S which make up the glass may be varied depending on the wavelength of applied light. However, a chalcogenide glass having a chemical composition represented by $GeS_2$ is mainly preferable.

The metal particles may be of any metal insofar as it can be optically doped in the chalcogenide glass when irradiated with light, and may be suitably selected depending on the purpose. For example, the metal particles may of Al, Au, Cu, Cr, Ni, Pt, Sn, In, Pd, Ti, Fe, Ta, W, Zn, Ag, or the like. Of these metals, Ag, Au, or Cu has such properties that it can more easily be optically doped, and Ag is particularly preferable as it is optically doped significantly.

The metal particles dispersed in the chalcogenide glass should preferably be contained in an amount ranging from 0.1 to 2 volume % with respect to the entire volume of the recording layer, and more preferably in an amount ranging from 0.1 to 1.0 volume %. If the contained amount of the metal particles is less than 0.1 volume %, then the change in transmittance caused by the optical doping may be insufficient, resulting in a reduction in the recording accuracy. If the contained amount of the metal particles is in excess of 2 volume %, then the light transmittance of the recording material may be lowered, making it difficult for the metal particles to sufficiently dope the chalcogenide glass.

The binder is used for the purposes of increasing the coating ability, film strength, and hologram recording characteristics, and suitably selected in view of the compatibility with the hologram material and the photothermal conversion material.

The binder is not limited to particular materials, but may be selected depending on the purpose. Example of the binder include copolymers of unsaturated acids ((meth)acrylic acids and itaconic acids), and alkyl (meth)acrylate, phenyl (meth) acrylate, benzyl (meth)acrylate, styrene, α-methylstyrene or the like; polymers of alkyl methacrylate or alkyl acrylate typified by polymethyl acrylate; copolymers of alkyl (meth) acrylate and acrylonitrile, vinyl chloride, vinylidene chloride, styrene or the like; copolymers of acrylonitrile and vinyl chloride, vinylidene chloride or the like; modified cellulose having a carboxyl group on its side chain; polyethylene oxide; polyvinyl pyrrolidone; novolak resins obtained by condensation reaction of phenol, o-, m-, p-cresol and/or xylenol and aldehyde, acetone, etc.; polyethers of epichlorohydrin and bisphenol A; soluble nylon; polychlorovinylidene; chlorinated polyolefins; copolymers of vinyl chloride and vinyl acetate; polymers of vinyl acetate; copolymers of acrylonitrile and styrene; copolymers of acrylonitrile, butadiene and styrene; polyvinyl alkyl ether; polyvinyl alkyl ketone; polystyrene; polyurethane, polyethylene terephthalate isophthalate; acetylcellulose; acetyl propoxy cellulose; acetyl butoxy cellulose; nitlicellulose; celluloid; polyvinyl butyral; epoxy resin; melamine resin; formalin resin; and the like. "(Meth)acryl" used herein means either or both acryl and methacryl.

The amount of the binder contained in the solid content of the recording layer is not limited to any amount, but may be selected depending on the purpose. For example, the amount of the binder should preferably be in the range from 10% to 95% by mass and more preferably in the range from 35% to 90% by mass. If the amount of the binder is less than 10% by mass, then a stable interference image may not be produced. If the amount of the binder is in excess of 95% by mass, then a desired diffraction efficiency may not be achieved.

The amount of the binder in the photosensitive layer should preferably be in the range from 10% to 95% by mass with respect to the entire solid content of the photosensitive layer, and more preferably in the range from 35% to 90% by mass.

According to the present embodiment, it is preferable for the recording layer to contain nitrocellulose for the purpose of increasing the photothermal conversion effect. Nitrocellulose is decomposed by the heat that is generated when a near-infrared laser beam is absorbed by a light absorbent, efficiently promoting the polymerization of the photopolymer.

The nitrocellulose is produced by converting natural cellulose refined according to a normal process into nitrate ester with a mixed acid and introducing a nitro group into part or all of three hydroxyl groups that are present in a glucopyranose ring which is a constituent of cellulose. The degree of nitration of the nitrocellulose should preferably in the range from 2 to 13, more preferably from 10 to 12.5, and much more preferably from 11 to 12.5. The degree of nitration refers to the weight % of nitrogen molecules in nitrocellulose. If the degree of nitration is very high, then it increases the ability to promote the polymerization of the photopolymer, but the room-temperature stability tends to decrease. In addition, nitrocellulose becomes explosive and dangerous. If the degree of nitration is low, the ability to promote the polymerization of the photopolymer is not sufficiently obtained.

The degree of polymerization of nitrocellulose should preferably be in the range from 20 to 200 and more preferably from 25 to 150. If the degree of polymerization is very high, then the removal of the recording layer tends to become incomplete. If the degree of polymerization is very low, the coating ability of the recording layer tends to become poor. The content of nitrocellulose in the recording layer should preferably be in the rang from 0% to 80% by weight with respect to the entire solid content of the recording layer, more preferably from 0.5% to 50% by weight, and much more preferably from 1% to 25% by weight.

The recording layer can be produced according to a known process depending on the materials. For example, the recording layer can be produced by an a vapor deposition process, a wet film formation process, an MBE (molecular beam epitaxy) process, a cluster ion beam process, a molecular stacking process, an LB process, a printing process, a transfer process, or the like. The two-way urethane matrix forming process described in U.S. Pat. No. 6,743,552 may also be employed.

The recording layer may suitably be formed according to the wet film formation process by using (applying and drying) a solution (coating solution) containing the materials of the recording layer which are dissolved or dispersed in a solvent, for example. The wet film formation process is not limited to any particular processes, but may be selected from known processes depending on the purpose. For example, the wet film formation process may be an ink jet method, a spin coating method, a kneader coating method, a bar coating method, a blade coating method, a casting method, a dipping method, a curtain coating method, or the like.

The thickness of the recording layer is not limited to a particular thickness, but may be suitably selected depending on the purpose. The thickness of the recording layer should preferably in the range from 1 to 1000 µm and more preferably from 100 to 700 µm.

If the thickness of the recording layer is in the above preferable numerical range, then a sufficient S/N ratio is achieved even if shifted multiple recording is performed thereon in a multiplicity of recording sessions ranging from 10 to 300. If the thickness of the recording layer is in the above more preferable numerical range, then a sufficient S/N ratio is notably achieved.

The protective layer 76 is made of a thermoplastic resin, a thermosetting resin, an electromagnetic-curable resin, glass, or the like. The thermoplastic resin should preferably be polycarbonate or amorphous polyolefin in terms of productivity. The glass is preferable in terms of accuracy.

The protective layer 76 has a thickness whose lower limit is 0.1 mm or greater, preferably 0.3 mm or greater, or more preferably 0.5 mm or greater, and whose upper limit is 2 mm or smaller, preferably 1.5 mm or smaller, and more preferably 1 mm or smaller. If the protective layer 76 is too thin, the optical information recording medium 12 tends to suffer a large warpage. If the protective layer 76 is too thick, then the optical information recording medium 12 tends to be heavy, putting a load on the control system 18 for rotating the optical information recording medium 12 at a high speed, so that it will be difficult to control the rotation of the optical information recording medium 12.

The protective layer 76 has a light transmittance whose lower limit is 70% or higher, preferably 80% or higher, and more preferably 90% or higher, and whose upper limit is 99.9% or lower, preferably 99% or lower, and more preferably 98% or lower. If the light transmittance is low, the accuracy of reading a signal is lowered, and if the light transmittance is high, the productivity is lowered.

The anti-reflection layer 66 is made of a granular material having an average particle diameter ranging from 0.001 µm to 10 µm measured by X-ray diffractometry. Surface irregularities of the anti-reflection layer 66 should preferably have dimensions ranging from 0.001 µm to 10 µm measured by an AFM (Atomic Force Microscope). If the particles of the granular material are too small, then the anti-reflection layer 66 has a poor adhesive capability, resulting in a poor keeping quality.

The material of the anti-reflection layer 66 may be a material selected from the group consisting of metal oxides including SiO, $SiO_2$, ZnO, $SnO_2$, $Al_2O_3$, $TiO_2$, $In_2O_3$, MgO, $ZrO_2$, etc., nitrides including $Si_3N_4$, AlN, TiN, BN, ZrN, etc., sulfides including ZnS, $I_2S_3$, $TaS_4$, etc., carbides including SiC, TaC, $B_4C$, WC, TiC, ZrC, etc., fluorides including $MgF_2$, etc., and diamond-like carbon, or a mixture of two or more materials selected from the above group.

The anti-reflection layer 66 can be produced by vacuum deposition, sputtering, plasma CVD, optical CVD, ion plating, or electron beam evaporation. Of these processes, sputtering is most preferable. Though DC magnetron or RF magnetron may be employed, DC magnetron sputtering is preferable.

The anti-reflection layer 66 should preferably comprise a single film or a laminated film structure including layers ranging from two to twelve layers. Specifically, the anti-reflection layer 66 comprises one or more laminated layers, preferably two or more or three or more laminated layers. The number of laminated layers has an upper limit selected from 12 layers or smaller, 8 layers or smaller, 6 layers or smaller, or 5 layers or smaller.

The anti-reflection layer 66 should preferably include alternate layers of high and low refractive indexes. The refractive index difference between adjacent layers of high and low refractive indexes should be in the range from 0.1 to 10. Specifically, the refractive index difference should preferably be 0.1 or greater, or 0.2 or greater, or 0.3 or greater, or 0.4 or greater. The refractive index difference has an upper limit of 10 or smaller, preferably 7 or smaller, and more preferably 5 or smaller. If the laminated film structure of the anti-reflection layer 66 is made up of three layers, for example, including a lower layer having a refractive index $n11$, an intermediate layer having a refractive index $n12$, and an upper layer having a refractive index $n13$, then these refractive indexes may be of the relationship: $n13 > n12 > n11$.

The anti-reflection layer 66 has a thickness preferably in the range from $\lambda/(20n)$ to $3\lambda$ where $\lambda$ represents the wavelength of the recording laser beam 20 and $n$ the refractive index of a medium which is positioned on the side of the anti-reflection layer 66 to which the recording laser beam 20 is applied. Specifically, the thickness is $\lambda/(20n)$ or greater, preferably $\lambda/(12n)$ or greater, more preferably $\lambda/(9n)$, and much more preferably $\lambda/(7n)$. The thickness has an upper limit of $3\lambda$ or smaller, preferably $2\lambda$ or smaller, more preferably $\lambda$ or smaller, and much more preferably $(3/4)\lambda$ or smaller.

The difference between the thickness of the anti-reflection layer 66 and the thickness of an adjacent layer should preferably be $\lambda/2$ where $\lambda$ represents the wavelength of the recording laser beam 20.

For recording information in the optical information recording medium 12 constructed as described above, the access control laser beam 28 is output from the second laser beam source 30, as shown in FIG. 1. The access control laser beam 28 is guided to the objective lens 44 in the pickup 14 by the first beam splitter 34, the first mirror 38, the second beam splitter 36, the quarter-wavelength plate 40, and the second mirror 46 in the pickup 14, and then converged onto the optical information recording medium 12 by the objective lens 44. The access control laser beam 28 that is converged onto the optical information recording medium 12 passes through the selective reflecting layer 70 and is reflected by the pregrooves on the reflecting layer 62 (which represent the shape of the pregrooves 78 defined in the substrate 60). The reflected access control laser beam 28 travels as the returning beam 32 via the objective lens 44, the second mirror 46, the quarter-wavelength plate 40, the second beam splitter 36, the first mirror 38, and the first beam splitter 34, and is applied to the photodetector 48. The returning beam 32 that is applied to the photodetector 48 is converted by the photodetector 48 into an electric signal, which is supplied to the controller 54.

Based on the supplied electric signal, the controller 54 controls the tracking control mechanism 50 and the focusing control mechanism 52 to control the tracking operation and focusing operation of the pickup 14.

At the time the controller 54 detects an address at which information is to be recorded, the laser beam 22 from the first laser beam source 24 is spatially modulated by the spatial optical modulator 26, generating the recording laser beam 20 having a pattern of the information beam 20a bearing information to be recorded and the recording reference beam 20b. The recording laser beam 20 is guided to the objective lens 44 in the pickup 14 by the second beam splitter 36, the quarter-wavelength plate 40, and the second mirror 46 in the pickup 14, and then converged onto the optical information recording medium 12 by the objective lens 44. The recording laser beam 20 that is converged onto the optical information recording medium 12 records a pattern depending on the information to be recorded on the recording layer 74.

The recording laser beam 20 is reflected by the selective reflecting layer 70 and prevented from being applied to the pregrooves 78. Therefore, the recording laser beam 20 is not scattered by the pregrooves 78.

For reproducing information recorded on the recording layer 74, a reproducing reference beam having the same pattern as the recording reference beam 20b is applied to the optical information recording medium 12. Specifically, when the reproducing reference beam is applied to the optical information recording medium 12, since an area to which the reference beam is applied has been modified by the information beam applied to record the information, the modified area reflects a beam as a reproducing beam representing the information beam. The reproducing beam is separated from the optical path for the reproducing reference beam, and detected by a solid-state imaging device, for example, which converts the reproducing beam into an electric signal.

As described above, the optical information recording medium 12 according to the present embodiment and the optical information recording medium 12 for use in the information recording method and the information recording system 10 according to the present embodiment have the dummy grooves 80 having the same shape as the pregrooves 78 in the areas adjacent to the effective access area 82 on the principal surface of the substrate. Therefore, the recording characteristics of a track on the outermost (or innermost) edge of the effective access area 82 and nearby tracks and the recording characteristics of the other tracks are substantially the same as each other, thereby greatly reducing recording errors.

Since the anti-reflection layer 66 is disposed on the protective layer 76 and is made of a granular material having an average particle diameter ranging from 0.001 μm to 10 μm, the access control laser beam 28 and the recording laser beam 20 are essentially prevented from being irregularly reflected by the interface between the optical information recording medium 12 and the air (i.e., the surface of the optical information recording medium 12). Therefore, noise is prevented from being added to the reproducing beam and the intensity of the reproduced signal is prevented from being lowered. The returning beam 32 of the access control laser beam 28, which has a wavelength different from the recording laser beam 20 and the reproducing laser beam, is also prevented by the anti-reflection layer 66 from being irregularly reflected by the surface of the optical information recording medium 12. Accordingly, highly accurate focusing and tracking characteristics can be maintained.

EXAMPLE 1

An experimental example will be described below. In the experimental example, error rates of recording errors of an example and a comparative example are measured.

According to the example, an optical information recording medium has dummy grooves 80 as is the case with the optical information recording medium 12 according to the present embodiment shown in FIG. 3. According to the comparative example, an optical information recording medium does not have dummy grooves 80 as is the case with the optical information recording medium 12A according to the comparative example shown in FIG. 4.

The experimental results are shown in FIG. 5. It can be seen from FIG. 5 that the error rate of the example is 1 and the error rate of the comparative example is 12, and the error rate of the example with the dummy grooves 80 is much lower. The error rate represents the number of error bits in 12.8 kbits.

The optical information recording medium, the information recording method, and the information recording system according to the present invention are not limited to the above embodiment, but may have various arrangements without departing from the scope of the invention.

The invention claimed is:

1. An optical information recording medium for being irradiated with an access control laser beam in addition to a recording laser beam having an information beam which bears information by spatially modulating a laser beam and a recording reference beam, comprising:
   a substrate having pregrooves for use in access control, defined in a principal surface thereof in an effective access area which can be accessed by said access control laser beam;
   a reflecting layer disposed on the principal surface of said substrate, for reflecting said access control laser beam;
   a selective reflecting layer disposed on said reflecting layer, for passing said access control laser beam therethrough and reflecting said recording laser beam; and
   a recording layer disposed on said selective reflecting layer, for recording information therein with said recording laser beam;
   said substrate having a dummy region in an area of said principal surface adjacent to said effective access area, said dummy region having dummy pregrooves similar to said pregrooves,
   wherein said dummy region is disposed between said effective access area and an outer circumferential end of said substrate and adjacent to an outermost edge of said effective access area,
   wherein said dummy region which is disposed between the outermost edge of said effective access area and the outer circumferential end of said substrate has an outer end in a position which is spaced 1 mm or more from the outer circumferential end of said substrate toward the center of said substrate, and
   wherein said dummy region has an inner end in a position which is spaced 10 mm or less from the outer circumferential end of said substrate toward the center of said substrate.

2. An optical information recording medium according to claim 1, wherein said dummy region has a range in terms of a radial length of the substrate which is equal to or greater than one-half of a spot diameter of said recording laser beam on a surface of said selective reflecting layer.

3. An optical information recording medium according to claim 1, wherein said dummy region has a range from 100 μm to 20 mm in terms of the radial length of the substrate.

4. An optical information recording medium for being irradiated with an access control laser beam in addition to a recording laser beam having an information beam which bears information by spatially modulating a laser beam and a recording reference beam, comprising:
   a substrate having pregrooves for use in access control, defined in a principal surface thereof in an effective access area which can be accessed by said access control laser beam;
   a reflecting layer disposed on the principal surface of said substrate, for reflecting said access control laser beam;
   a selective reflecting layer disposed on said reflecting layer, for passing said access control laser beam therethrough and reflecting said recording laser beam; and
   a recording layer disposed on said selective reflecting layer, for recording information therein with said recording laser beam;
   said substrate having a dummy region in an area of said principal surface adjacent to said effective access area, said dummy region having dummy pregrooves similar to said pregrooves,
   wherein said dummy region is disposed between said effective access area and an inner circumferential end of said substrate and adjacent to an innermost edge of said effective access area,
   wherein said dummy region which is disposed between the innermost edge of said effective access area and the inner circumferential end of said substrate has an inner end in a position which is spaced 10 mm or more from the inner circumferential end of said substrate toward the outer circumferential end of said substrate, and
   wherein said dummy region has an outer end in a position which is spaced 22 mm or less from the inner circumferential end of said substrate toward the outer circumferential end of said substrate.

5. An optical information recording medium according to claim 4, wherein said dummy region has a range in terms of a radial length of the substrate which is equal to or greater than one-half of a spot diameter of said recording laser beam on a surface of said selective reflecting layer.

6. An optical information recording medium according to claim 4, wherein said dummy region has a range from 100 μm to 20 mm in terms of the radial length of the substrate.

7. An information recording method of recording information in an optical information recording medium by guiding an information beam which bears information by spatially modulating a laser beam and a recording reference beam to the same optical path to produce a recording laser beam, and applying the recording laser beam and an access control laser beam to the optical information recording medium, wherein said optical information recording medium comprises:
   a substrate having pregrooves for use in access control, defined in a principal surface thereof in an effective access area which can be accessed by said access control laser beam;
   a reflecting layer disposed on the principal surface of said substrate, for reflecting said access control laser beam;
   a selective reflecting layer disposed on said reflecting layer, for passing said access control laser beam therethrough and reflecting said recording laser beam; and
   a recording layer disposed on said selective reflecting layer, for recording information therein with said recording laser beam;
   said substrate having a dummy region in an area of said principal surface adjacent to said effective access area, said dummy region having dummy pregrooves similar to said pregrooves,
   wherein said dummy region is disposed between said effective access area and an outer circumferential end of said substrate and adjacent to an outermost edge of said effective access area, wherein said dummy region which is disposed between the outermost edge of said effective access area and the outer circumferential end of said substrate has an outer end in a position which is spaced 1 mm or more from the outer circumferential end of said substrate toward the center of said substrate, and wherein said dummy region has an inner end in a position which is spaced 10 mm or less from the outer circumferential end of said substrate toward the center of said substrate.

8. An information recording system for recording information in an optical information recording medium by applying a recording laser beam and an access control laser beam to the optical information recording medium, comprising:

means for outputting an information beam which bears information by spatially modulating a laser beam;

means for outputting a recording reference beam;

means for guiding said information beam and said reference beam to the same optical path to produce the recording laser beam; and means for outputting the access control laser beam;

wherein said optical information recording medium comprises:

a substrate having pregrooves for use in access control, defined in a principal surface thereof in an effective access area which can be accessed by said access control laser beam;

a reflecting layer disposed on the principal surface of said substrate, for reflecting said access control laser beam;

a selective reflecting layer disposed on said reflecting layer, for passing said access control laser beam therethrough and reflecting said recording laser beam; and a recording layer disposed on said selective reflecting layer, for recording information therein with said recording laser beam;

said substrate having a dummy region in an area of said principal surface adjacent to said effective access area, said dummy region having dummy pregrooves similar to said pregrooves, wherein said dummy region is disposed between said effective access area and an outer circumferential end of said substrate and adjacent to an outermost edge of said effective access area, wherein said dummy region which is disposed between the outermost edge of said effective access area and the outer circumferential end of said substrate has an outer end in a position which is spaced 1 mm or more from the outer circumferential end of said substrate toward the center of said substrate, and wherein said dummy region has an inner end in a position which is spaced 10 mm or less from the outer circumferential end of said substrate toward the center of said substrate.

9. An information recording method of recording information in an optical information recording medium by guiding an information beam which bears information by spatially modulating a laser beam and a recording reference beam to the same optical path to produce a recording laser beam, and applying the recording laser beam and an access control laser beam to the optical information recording medium, wherein said optical information recording medium comprises:

a substrate having pregrooves for use in access control, defined in a principal surface thereof in an effective access area which can be accessed by said access control laser beam;

a reflecting layer disposed on the principal surface of said substrate, for reflecting said access control laser beam;

a selective reflecting layer disposed on said reflecting layer, for passing said access control laser beam therethrough and reflecting said recording laser beam; and a recording layer disposed on said selective reflecting layer, for recording information therein with said recording laser beam said substrate having a dummy region in an area of said principal surface adjacent to said effective access area, said dummy region having dummy pregrooves similar to said pregrooves, wherein said dummy region is disposed between said effective access area and an inner circumferential end of said substrate and adjacent to an innermost edge of said effective access area, wherein said dummy region which is disposed between the innermost edge of said effective access area and the inner circumferential end of said substrate has an inner end in a position which is spaced 10 mm or more from the inner circumferential end of said substrate toward the outer circumferential end of said substrate, and wherein said dummy region has an outer end in a position which is spaced 22 mm or less from the inner circumferential end of said substrate toward the outer circumferential end of said substrate.

10. An information recording system for recording information in an optical information recording medium by applying a recording laser beam and an access control laser beam to the optical information recording medium, comprising:

means for outputting an information beam which bears information by spatially modulating a laser beam;

means for outputting a recording reference beam;

means for guiding said information beam and said reference beam to the same optical path to produce the recording laser beam; and means for outputting the access control laser beam;

wherein said optical information recording medium comprises:

a substrate having pregrooves for use in access control, defined in a principal surface thereof in an effective access area which can be accessed by said access control laser beam;

a reflecting layer disposed on the principal surface of said substrate, for reflecting said access control laser beam;

a selective reflecting layer disposed on said reflecting layer, for passing said access control laser beam therethrough and reflecting said recording laser beam; and a recording layer disposed on said selective reflecting layer, for recording information therein with said recording laser beam;

said substrate having a dummy region in an area of said principal surface adjacent to said effective access area, said dummy region having dummy pregrooves similar to said pregrooves, wherein said dummy region is disposed between said effective access area and an inner circumferential end of said substrate and adjacent to an innermost edge of said effective access area, wherein said dummy region which is disposed between the innermost edge of said effective access area and the inner circumferential end of said substrate has an inner end in a position which is spaced 10 mm or more from the inner circumferential end of said substrate toward the outer circumferential end of said substrate, and wherein said dummy region has an outer end in a position which is spaced 22 mm or less from the inner circumferential end of said substrate toward the outer circumferential end of said substrate.

* * * * *